United States Patent [19]

Sharp

[11] Patent Number: 5,052,217

[45] Date of Patent: * Oct. 1, 1991

[54] CONTAINMENT SYSTEM FOR FILL LINE OF UNDERGROUND STORAGE TANK

[76] Inventor: Bruce R. Sharp, 7685 Fields-Ertel Rd., Cincinnati, Ohio 45241

[*] Notice: The portion of the term of this patent subsequent to Apr. 3, 2007 has been disclaimed.

[21] Appl. No.: 450,820

[22] Filed: Dec. 14, 1989

Related U.S. Application Data

[63] Continuation-in-part of Ser. No. 281,816, Dec. 8, 1988, Pat. No. 4,912,966, which is a continuation-in-part of Ser. No. 666,691, Jun. 26, 1987, abandoned, which is a continuation-in-part of Ser. No. 820,027, Aug. 11, 1987, Pat. No. 4,685,327, which is a continuation-in-part of Ser. No. 740,869, Jun. 3, 1985, Pat. No. 4,607,522, which is a continuation-in-part of Ser. No. 544,013, Oct. 21, 1983, Pat. No. 4,523,454, which is a continuation-in-part of Ser. No. 544,012, Oct. 21, 1983, abandoned, and a continuation-in-part of Ser. No. 745,540, Jun. 17, 1985, abandoned.

[51] Int. Cl.⁵ .............................. G01M 3/32
[52] U.S. Cl. .................... 73/49.2; 220/85 S
[58] Field of Search ............. 73/49.2; 220/DIG. 5, 220/85 S, 85 VR, 85 VS, 1 B, 18, 5 A

[56] References Cited

U.S. PATENT DOCUMENTS

| | | | |
|---|---|---|---|
| 1,156,469 | 10/1915 | Dodge | 220/85 S |
| 4,527,708 | 7/1985 | Dundas et al. | 220/85 S X |
| 4,637,522 | 1/1987 | Klop | 220/85 VR X |
| 4,639,164 | 1/1987 | Pugnale et al. | 220/1 B X |
| 4,653,312 | 3/1987 | Sharp | 73/49.2 |
| 4,655,361 | 4/1987 | Clover et al. | 220/18 X |
| 4,685,327 | 8/1987 | Sharp | 73/49.2 |
| 4,685,585 | 8/1987 | Robbins | 220/5 A X |
| 4,717,036 | 1/1988 | Dundas et al. | 220/85 S X |
| 4,884,709 | 12/1989 | McCarthy | 220/1 B X |
| 4,895,272 | 1/1990 | De Benedittis et al. | 220/85 S |
| 4,912,966 | 4/1990 | Sharp | 73/49.2 |

FOREIGN PATENT DOCUMENTS

| | | | |
|---|---|---|---|
| 755751 | 2/1971 | Belgium | 220/85 S |
| 763788 | 8/1971 | Belgium | 220/85 S |
| 2900960 | 7/1969 | Fed. Rep. of Germany | 73/49.2 |
| 1548526 | 10/1968 | France | 73/49.2 |
| 565999 | 8/1975 | Switzerland | 73/49.2 |

Primary Examiner—Hezron E. Williams
Assistant Examiner—Joseph W. Roskos
Attorney, Agent, or Firm—Charles R. Wilson

[57] ABSTRACT

A storage tank system especially useful for storing liquid gasoline comprises a storage tank, a covered sleeve attached to the storage tank and encompassing a fill line, a drip sump compartment positioned on the cover of the sleeve and a fill line extending through the drip sump compartment and sleeve. The enclosed sleeve area is preferably monitored for leakage. The storage tank as well as structural accessories such as a dispensing line can have an outer containment wall. The system results in a storage facility which is not likely to lose its stored liquid to the environment due to slow leaks or a sudden large leak by providing total containment capability.

15 Claims, 6 Drawing Sheets

CONTAINMENT SYSTEM FOR FILL LINE OF UNDERGROUND STORAGE TANK

This application is a continuation-in-part of "Total Containment Means For Storage Tank Systems", Ser. No. 07/281,816, filed Dec. 8, 1988, now U.S. Pat. No. 4,912,966 which is a continuation-in-part of "Total Containment And Overfill Storage Tank System", Ser. No. 07/066,691, filed June 26, 1987, now abandoned which is a continuation-in-part of "Total Containment Storage Tank System", Ser. No. 820,027, filed Aug. 11, 1987, now U.S. Pat. No. 4,685,327, which is a continuation-in-part of "Storage Tanks Having Secondary Containment Means," Ser. No. 06/740,869, filed June 3, 1985, now U.S. Pat. No. 4,607,522, which is a continuation-in-part of "External Jacket System As Secondary Containment For Storage Tanks", Ser. No. 544,013, filed Oct. 21, 1983, now U.S. Pat. No. 4,523,454 and Ser. No. 580,800, for "Storage Tank Systems", filed Feb. 16, 1984, now U.S. Pat. No. 4,524,609 which is a continuation-in-part of "Storage Tank Systems", Ser. No. 06/544,012, filed Oct. 21, 1983, now abandoned and a continuation-in-part of "Fiberglass Reinforced Resin Storage Tanks With Secondary Containment Means", Ser. No. 06/745,540, filed June 17, 1985, now abandoned.

This invention relates to liquid storage tank systems. More particularly, the invention relates to double walled storage tank systems having total leak prevention means.

BACKGROUND OF THE INVENTION

Storage tanks are widely used for storing a variety of liquids. Some of these liquids are hazardous and can be corrosive and/or flammable. In particular, underground storage tanks are used extensively for the storage of liquid gasoline at retail gasoline stations. Typical underground storage tanks are constructed with structural accessories such as a manway, its lid, and access lines for filling, dispensing, and venting. The accessories described are examples of structures through which liquids and vapors flow and all of which are normally located at the top of the tank.

The service life of a storage tank system will vary, but eventually the tank and its access lines will leak. Leaks from the tank system often happen within a few years after the new tank and lines are installed, due to improper installation or flaws in the manufacturing of the tanks and lines. Leakage problems are particulary troublesome in that gasoline storage tanks are usually buried underground. Any leaks which develop are normally very slow initially and are very difficult to detect. Leaks from subterranean tanks or their accessories can result in a significant danger to the environment and health of nearby residents. Federal as well as local regulations govern the design and maintenance of such storage tanks.

Heightened public awareness of the danger posed by underground storage tanks has led to additional governmental regulations. Recent proposed regulations will require most storage tanks to have secondary containment means and possibly a fail safe leak detection design feature to guard against accidental soil and water contamination. Secondary containment is accomplished by a jacket completely encasing the tank and structural accessories. The tank and related accessories are referred to as the primary containment system. Any jacket or wall encasing the primary system is often referred to as a secondary containment system.

There now has been discovered a secondary containment system encasing the fill line and, optionally, other structural accessories of a liquid underground storage tank. The storage tank itself can have a secondary containment feature. The present invention solves the problems inherent with existing tank systems with provisions for leak detection means.

SUMMARY OF THE INVENTION

The present invention is concerned with underground storage tank systems. The system comprises (a) a storage tank, (b) a sleeve attached to the tank to form an area through which a fill line and optionally other access lines pass, said sleeve further having a cover to form an enclosed sleeve area, (c) a drip sump compartment positioned on the cover to the sleeve, said compartment having means for communication with the interior of the storage tank and (d) a fill line which extends through the drip sump compartment and the sleeve area. The fill line has one end terminating near a top of the drip sump compartment near ground surface for filling purposes and a second end opening into the storage tank's interior. The fill line is completely encased by the drip sump compartment and sleeve so as to contain any leakage.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention. However, the invention lends itself particularly well to underground tanks used for storing liquid gasoline and, therefore this preferred use is described in the following paragraphs.

Figure 1:
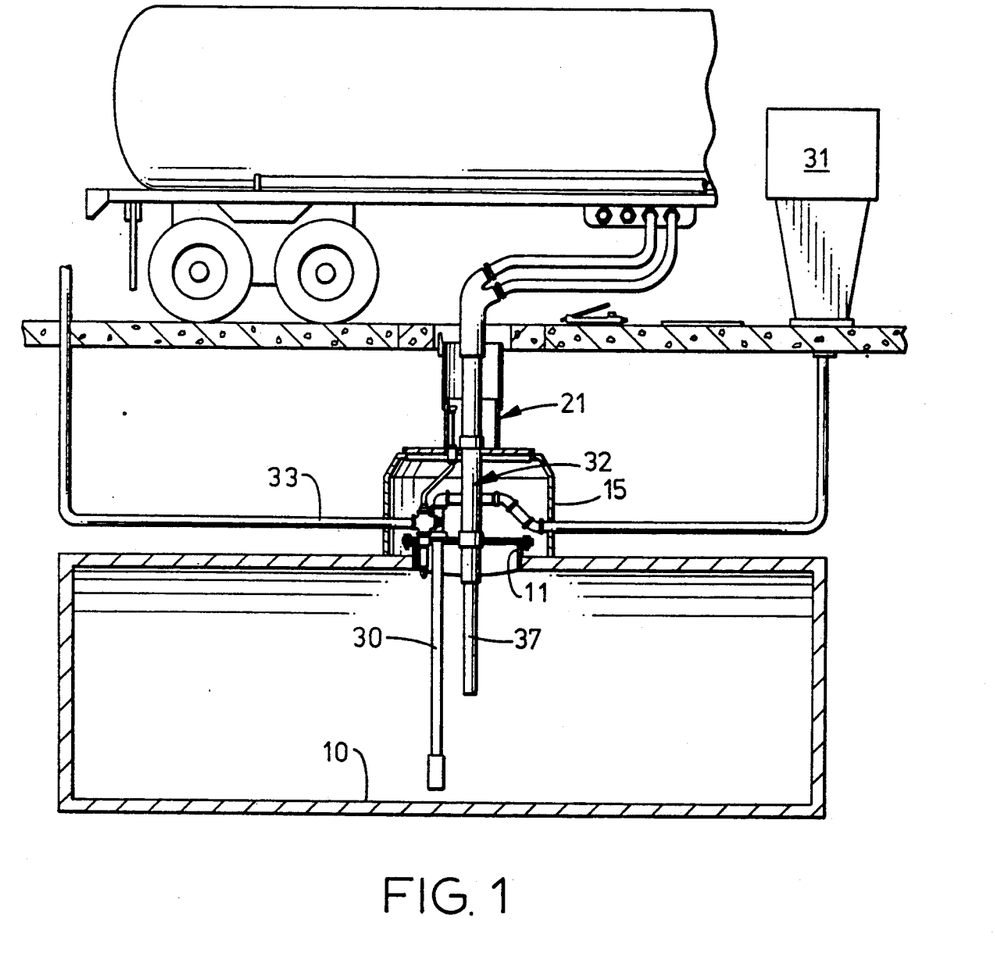
FIG. 1 is a side view, partially in section, of the fill line containment system of this invention mounted on an underground storage tank.
Figure 2:
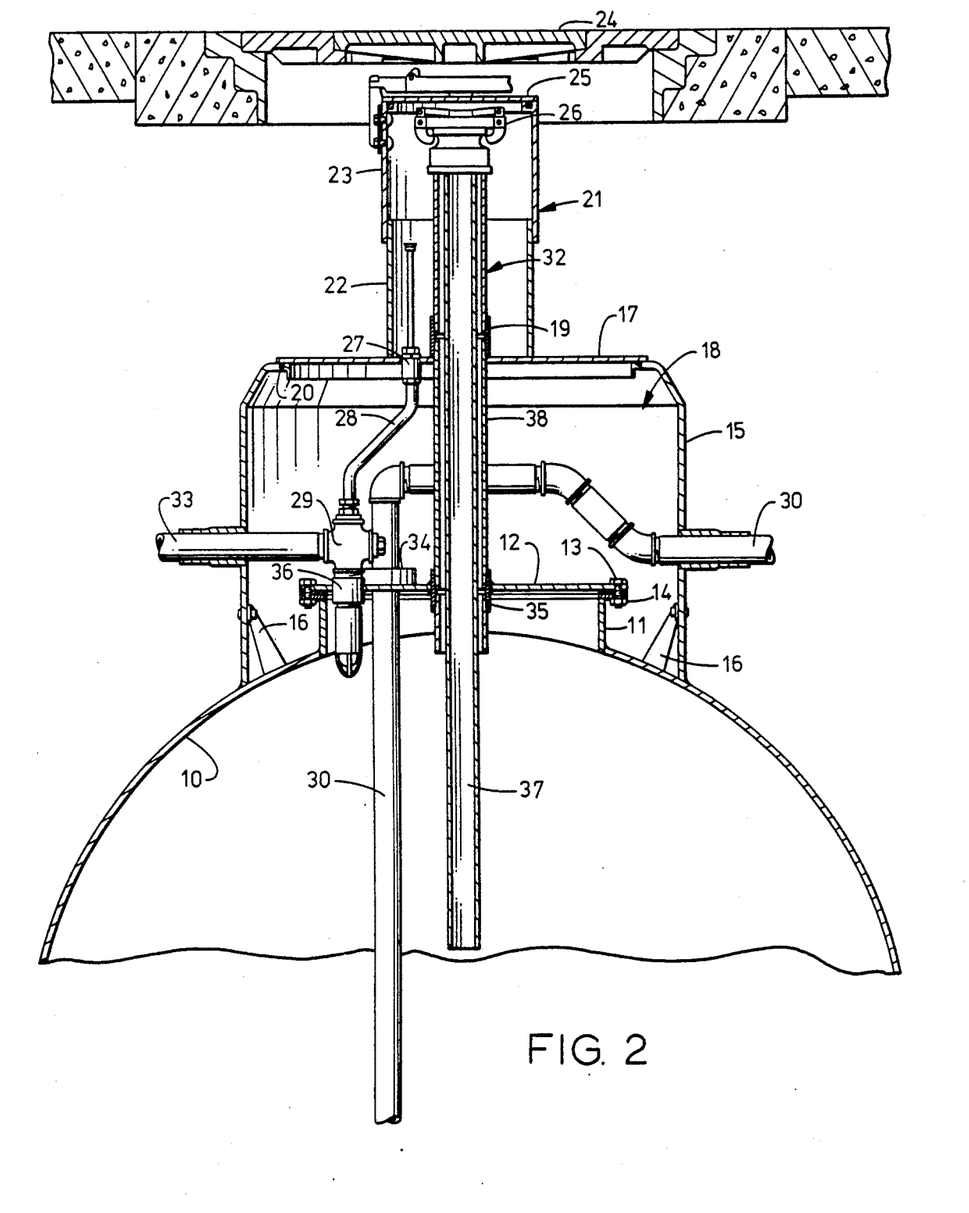
FIG. 2 is a cross-section view, partially in section of the fill line containment system and storage tank of FIG. 1.

With reference to FIGS. 1 and 2, the present invention utilizes an inner storage tank 10. The inner tank is made of metal such as steel. A fibrous reinforced resinous material e.g. a fiberglass reinforced polyester or vinylester material can also be used to form the tank. As shown, though not required, a manway 11 is securely attached to the storage tank. The manway's primary function is to serve as a means by which access can be gained to the interior of the tank. Removal of a cover 12 after disconnecting all access lines passing through the cover will allow an individual to enter the tank for repair or inspection purposes. As a secondary function, the manway provides a means by which the various access lines enter the tank. The manway is generally cylindrical in shape and about one to three feet in diameter, though other shapes and dimensions can be utilized. The cover 12 is securely fastened to the manway 11, preferably in liquid tight fashion by known attachment means, e.g. bolts 13 and nuts 14. Storage tanks used in this invention, with or without the manway are well known and are commonly used for storage of various liquids.

In accord with this invention, a sleeve 15 extends around and encloses manway 11. The sleeve is preferably cylindrical in shape but can be other shapes as well and extends about twelve inches to about forty-eight inches above the storage tank 10. It is securely mounted to the storage tank 10, e.g. by welding or fiberglassing. Sleeve supports 16 can be used to attach the sleeve 15 to the tank. The supports, in the form of brackets are secured to the tank 10 and the sleeve. Preferably, each support is made of a similar material as the primary tank. A liquid tight seal is used where the sleeve and wall of the storage tank are secured together to retain any leaked liquid that may be encountered as further discussed below. Other sleeve supports of various natures can be used. For example, a ring properly dimensioned, can be attached to the storage tank and the sleeve slides into or over the ring and secured together.

A sleeve cover 17 seals the sleeve's interior and forms a sleeve area 18. The cover is held in a light tight relationship to the sleeve by means of a compression coupling 19. The cover rests on a flange of the sleeve. A compression gasket 20 is positioned between the sleeve flange and sleeve cover. Tightening of the coupling on a threaded line passing through the cover, e.g. a fill line creates an equal pressure around the periphery of the cover. The cover can as well rest on a flange of the sleeve and be bolted thereto.

A drip sump compartment 21 is positioned on sleeve cover 17. Liquid capacity of the sump area within the compartment is approximately one to twenty-two gallons. The area within the compartment is not intended for overfill purposes but rather is used as a drippings catcher. The problem with using the sump area as a overfill area is that it is not doubled walled and is lacking in capacity. The sump area is used to collect any drippings that may result from a loose connection and/or during disconnecting of a flexible delivery hose leading from a transport tank truck to a fill line as discussed below.

The drip sump compartment 21 has a lower cylinder 22 immovably attached, preferably in a liquid tight manner, to sleeve cover 17. The lower cylinder 22 has secured to it an adjustable slide height upper cylinder 23 which can be moved so that its top rim is near the under surface of a conventionally used surface manhole cover 24. The preferred height of the lower and upper cylinders as measured from the sleeve cover 17 is about one to three inches, but not exceeding about thirty-six inches. When the preferred height is adjusted to be in proper proximity to the surface manhole cover, cylinders 22 and 23 are sealed together. Sealing methods such as gluing, welding, or band clamping are various known methods which can be used. An optional cover cap 25 is provided over the adjustable slide height cylinder 23 to keep the interior sump area free of dirt and water. An additional fill line cap 26 is provided on the fill line.

A sump drain valve 27 is used to drain any drippings caught within the compartment back to the primary tank 10. The valve is securely fastened and preferably sealed to the cover 17. Upon opening the valve the liquids are drained through a drain hose 28 into the top of T-vent 29, which is in communication with the interior of the storage tank 10 through the vent line.

A second drip sump compartment can optionally be positioned on the sleeve cover. The second compartment would be used to enclose another line, e.g. a dispensing line or vapor recovery tube to ensure primary containment of such line. It should be apparent as well that all lines could alternatively pass through a single drip sump compartment.

Passing through the sleeve and manway are various access lines typically associated with underground storage tanks. Thus, a dispensing line 30 leads to a ground level gasoline dispenser 31, a fill line 32 leads to a capped opening at or near the ground surface and a vent pipe 33 leads to the atmosphere. They are all secured to the manway's cover by double threaded bushings 34, 35, and 36, respectively. In that embodiment of the invention wherein the storage tank has no manway, the aforementioned access lines are secured directly to the top surface of the tank within the sleeve area.

The fill line 32 as shown is a coaxial fill line comprised of an inner fill pipe 37 and a concentric outer vapor recovery tube 38. The fill pipe extends into the storage tank with an opening near the tank's bottom surface to minimize splashing and consequent vapor formation during the filling operation. The vapor recovery tube 38 has one opening at the tank's top surface. A second opening is at the upper or fill end of the fill line. Its purpose is to receive vapors from the filling operation and direct them back to a return line leading to the transport tank truck.

It should be apparent that effective secondary containment of the storage tank's accessories is provided by the sleeve 15 and drip sump compartment 21. The tank's manway 11 is encompassed by the sleeve 15 while the fill line 32 is encompassed by the drip sump compartment 21 and the sleeve 15. Any leakage in the manway or fill line will be contained. Additionally, any accidental spills during a filling operation will be caught by the drip sump compartment and directed to the storage tank. Further, it should be evident that those areas of the dispensing line and vent pipe which are most likely to leak, i.e. where connections are needed are also contained. At the same time, the fill line containment system is readily mounted onto existing storage tank structures.

Figure 3:
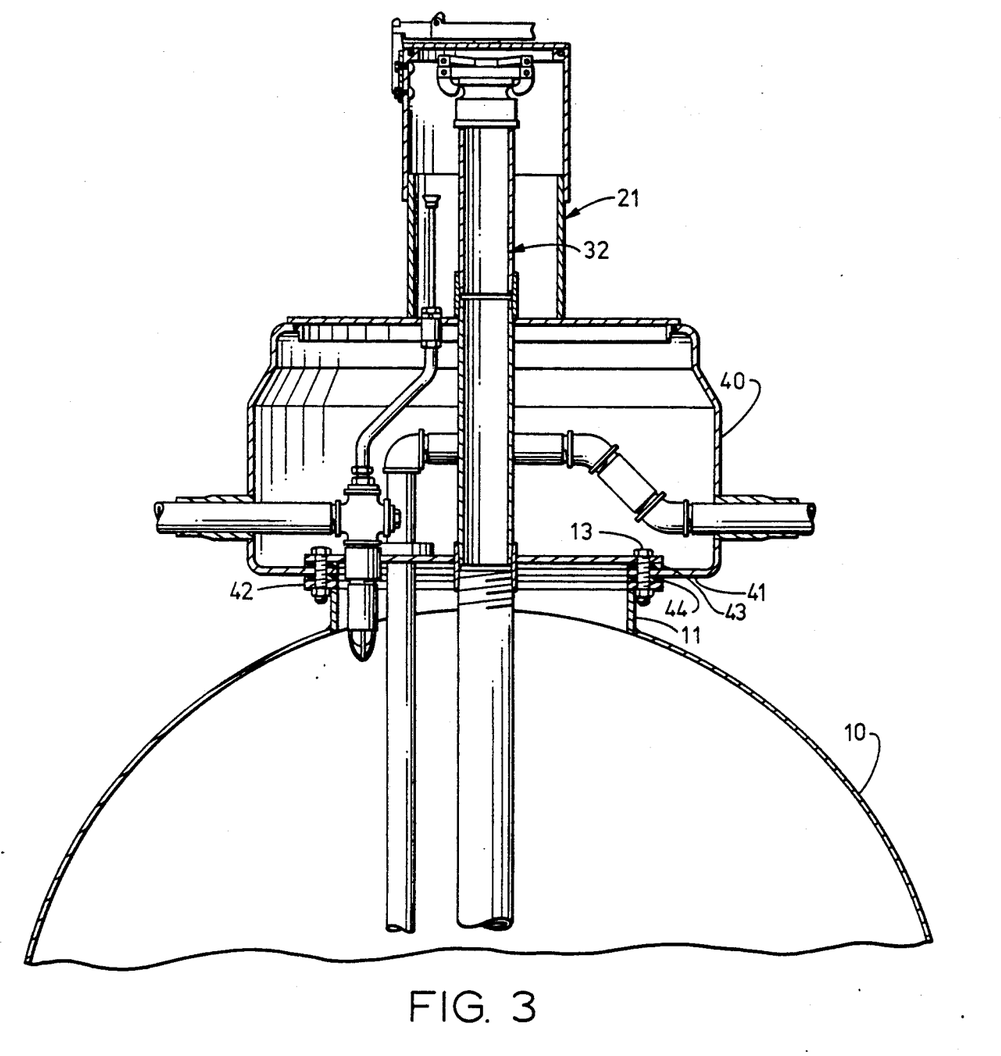
FIG. 3 is an end view, partially in section, showing an embodiment of the invention wherein a sleeve component of the fill line containment system is mounted to a manway cover of a rigid storage tank.
Figure 4:
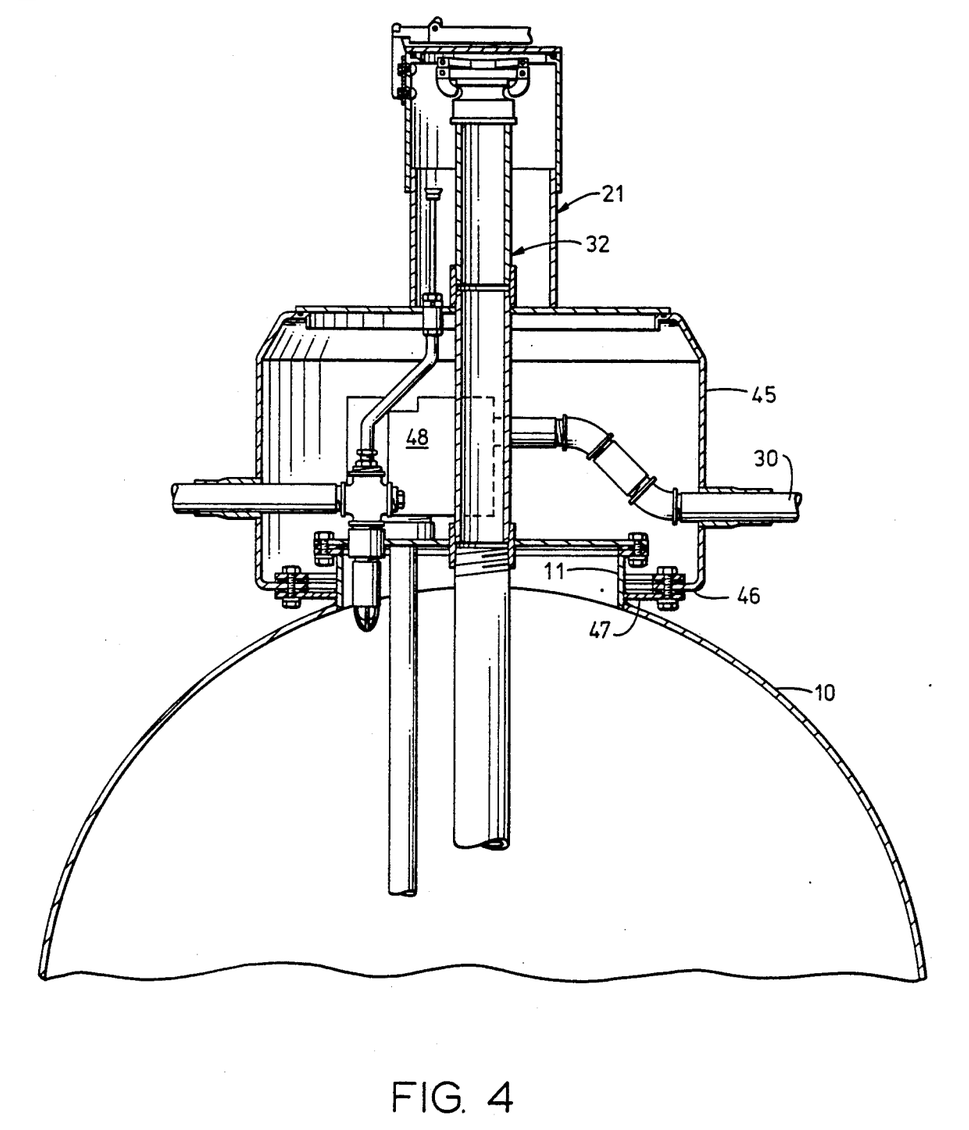
FIG. 4 is an end view, partially in section, showing another embodiment of invention wherein the sleeve component of the fill line containment system is mounted on a manway wall of a rigid storage tank.

FIGS. 3 and 4 illustrate alternative ways to attach the sleeve of the fill line containment system to a storage tank which has a manway. Thus, in FIG. 3, sleeve 40 is dimensioned to have a lower flange wall 41 which is mated with a flange 42 found on the manway 11. Gaskets 43 and 44 on each side of the split ring are used to ensure a liquid tight fitting. A set of holes found in the flange 41 receive bolts 13 to provide a convenient manner of sleeve attachment.

As shown in FIG. 4, sleeve 45 of the fill line containment system has a lower flange 46 which is attached to flange 47 mounted to the wall of the manway 11. A continuous weld is preferably used to obtain a liquid tight seal. The advantage of this attachment means is in the ease of installation to an existing storage tank. Also shown in this embodiment of the invention is a dispenser pump 48 mounted within the sleeve area. Thus, the sleeve area can serve a secondary function of providing a convenient place for the needed dispenser pump.

Figure 5:
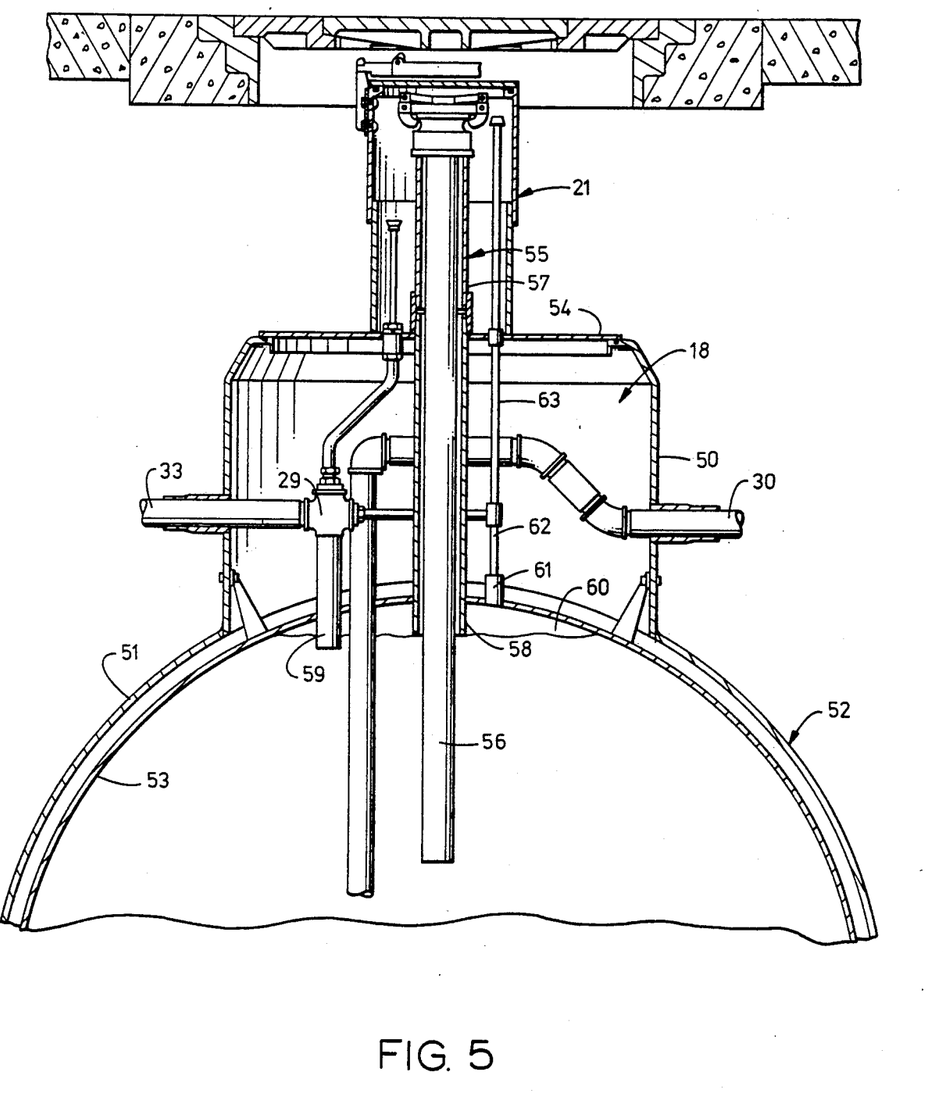
FIG. 5 is an end view, partially in section, showing an embodiment of the invention wherein the sleeve component of the fill line containment system is mounted to the outer wall of a double wall storage tank and further showing an overfill system.
Figure 6:
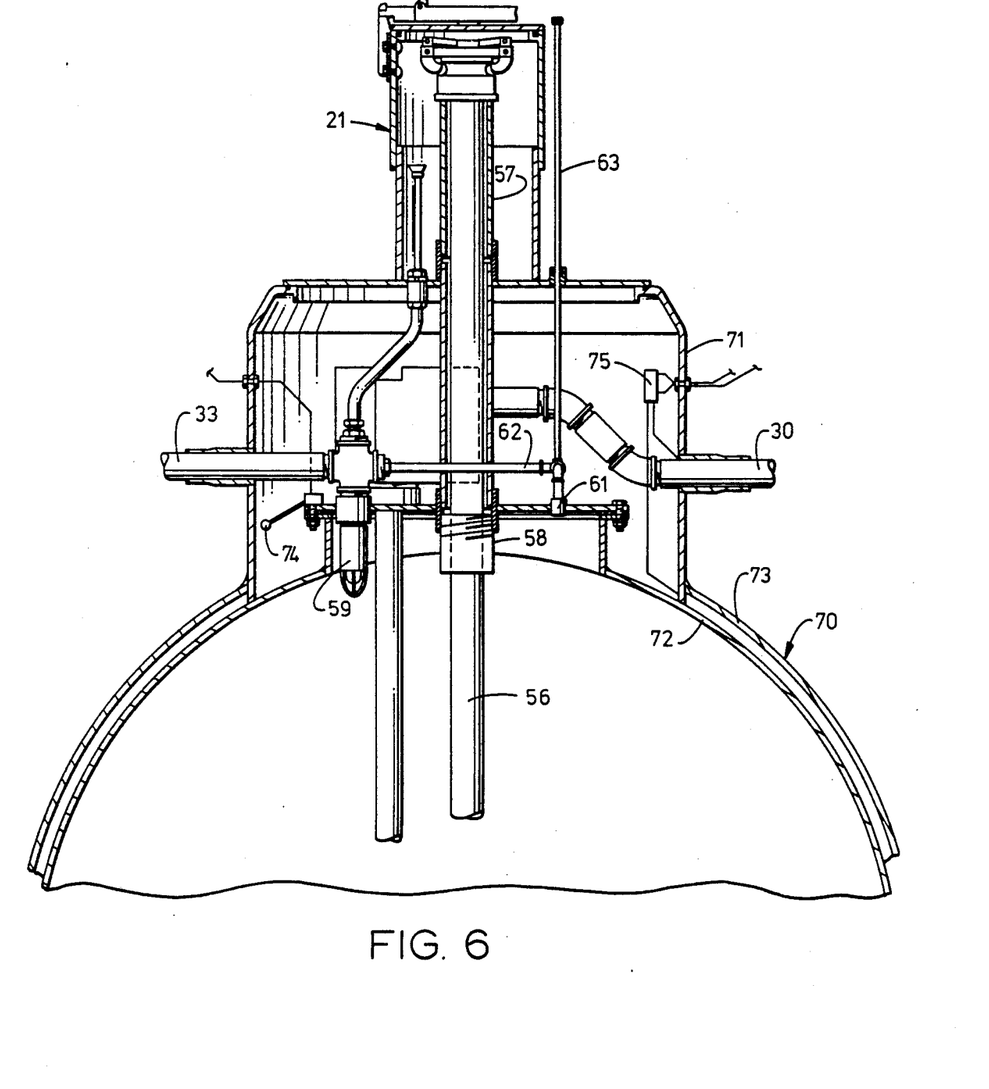
FIG. 6 is another double wall storage tank showing the sleeve of the containment system mounted to the wall of an inner storage tank and further showing the use of monitor means.

As shown in FIGS. 5 and 6 double wall storage tanks can be used in this invention. The outer wall acts as a secondary containment means in case of leakage through the inner wall. In these embodiments, total secondary containment of the storage system, including the storage tank and fill line is provided.

With respect to FIG. 5, a fill line containment system is shown wherein a sleeve 50 is attached to an outer wall 51 of the double wall tank 52. The sleeve and outer wall effectively encompasses the inner storage tank 53. Outer wall 51 is constructed of a material of sufficient strength to contain the stored gasoline in case of a leak. The outer wall can be made of a thin gauge steel as shown or a synthetic polymeric material, including an elastomeric material such as rubber, e.g. Buta-N, neoprene, fluoroelastomer, e.g. Viton, polyester, vinyl esters, polyethylene (preferably a low density polyethylene), polypropylene, polyvinylchloride, polyurethane, polyepoxie and various fiber reinforced, fabric and vinyl backed sheets of any of the foregoing materials as well as materials constructed of two or more of the foregoing materials, e.g. fluoroelastomer coated polyethylene. Fiberglass reinforced polyesters and vinyl esters are two preferred wall materials. The listed materials used in construction of the outer wall are not all inclusive, but only illustrative of some of the materials that can be used. Preferably, the outer wall is made of at least one material which is gasoline impervious.

The shape of the outer wall 51 is such that it encases the inner storage tank 53 to form a closed space between it and the inner tank. The outer wall is sized to hold all of the inner tank's contents. Additionally, outer wall 51 at least extends to sleeve 50. Preferably, wall 51 extends to the top rim of the sleeve and is secured thereto. (As discussed more fully below, any leakage from the storage tank, including manway will be contained by the outer wall.)

In effect, the outer wall encases the inner tank to provide secondary containment of liquid contained within the primary containment means, i.e. the inner storage tank. Similarly, sleeve 50 and sleeve cover 54 encase a part of the fill line 55 to provide secondary containment of this accessory part of the tank. Drip sump compartment 21 also encases a part of the fill line 55. The fill line containment comprised of the sleeve 50 and drip sump compartment 21 together with outer wall 51 provide true secondary containment of the storage tank system.

Also shown in FIG. 5 is an optional overfill feature which is particularly adapted for use in this invention. The drip sump compartment, because of its limited capacity is only able to catch minor spills and drippings. However, the inner storage tank 53 is provided with an internal retained capacity area which is capable of controlling overfills. The fill line 55 has an inner fill pipe 56 through which liquid flows during a filling operation. A concentric outer vapor recovery tube 57 leads from the fill end of the fill pipe to the top wall of the inner storage tank 53. Additionally, a vapor recovery extension tube 58 extends from about two inches to about eighteen inches from the top surface of the inner storage tank into the tank's interior. Similarly, a vent extension line 59 extends from about two inches to about eighteen inches from the top surface of the inner storage tank into the tank's interior. During the filling operation, liquid will flow through the fill pipe 56 and fill the storage tank until its level reaches the uppermost of the terminal ends of the vapor recovery extension tube 58 and vent extension line 59. A build-up of pressure resulting from air and vapors which are trapped in the upper part of the storage tank will prevent additional liquid from entering the area. An upper portion 60 of the storage tank represents the retained capacity area.

A trapped vapor release valve 61 and by-pass vent line 62 are also provided. The release valve 61 is controlled by a ground level control rod 63. The by-pass vent line 62 leads from the release valve to the T-vent 29 and vent line 33. Once the storage tank is substantially filled, the tank truck operator shuts off a flow valve at the truck and then turns the control rod to release pressure in the storage tank to the vent line. Liquid which has remained in the tank truck's delivery hose, and liquid which has filled the vapor recovery tube and vent line is now able to drain by gravity into the retained capacity area.

Obviously, the system shown in FIG. 5 is able to solve many of the problems faced by the service station industry. A fill drippings feature is provided by the drip sump compartment; an overfill feature is provided by the internal retained capacity components; a secondary containment feature of the tank's fill line and other accessory lines is provided by the drip sump compartment and the sleeve; and a secondary containment feature of the inner storage tank is provided by the outer wall.

FIG. 6 illustrates a double wall storage tank 70 wherein the sleeve 71 of the fill line containment system is mounted in a manner wherein the areas around the inner tank and the manway are segregated. Thus, the sleeve is mounted to a wall of the inner tank 72. The advantage of this is that any leakage in the inner tank will be contained in the enclosed annular space provided by the outer wall 73. Similarly, any leakage in the manway or access lines passing through it will be contained by the sleeve 71.

Leak detection means are preferably used in the closed space to monitor for leakage through either the inner storage tank 72 or outer wall 73. Several different types of detection means can be used, including pressure change detectors, gas or liquid analyzers, and electronic probes. The detection means itself is preferably positioned within the sleeve for ready accessibility. As shown, a detection means 74 is positioned in the sleeve area. The detection means can be periodically checked or it can be electronically connected to a remote receiving station for continuous monitoring. Additionally, a second leak detection means 75 leads to the closed space between the inner tank and outer wall to sample that space for leakage. Optionally, a sampling pipeline can extend completely to the bottom of the closed space where leaked liquid is likely to drain. These pipelines can follow the contour of the tank's outer wall or pass directly through the tank's storage area and bottom surface. Liquid tight fittings, of course, are required with the direct pipelines.

A preferred leak detection means utilizes non-atmospheric air pressure throughout the closed space. Such detection means associated with the closed space between the inner tank and outer wall is capable of detecting any change in pressure resulting from a leak in the inner tank or outer wall. Conventional air pressure or a vacuum means is used for providing a positive or negative pressure. The use of air pressure with a flexible outer wall is not preferred because the wall may be gas permeable to a certain degree and loss of pressure because of this must be compensated for. When a vacuum is used, reinforcing means are used to maintain a spaced relationship between the tank and outer wall. A gas pervious material, for example a continuous foraminous or porous matting is placed within the closed annular space to maintain the spaced relationship. Jute, polyurethane foam, fiberglass matting, cotton matting, nylon matting and asbestos are examples of materials which can be used. A line leads from the non-atmospheric air pressure means to a gauge conveniently positioned, e.g. in an attendant's area for periodic checking.

Other leak detection means, e.g. a probe positioned within the sleeve area or closed space can be used. The probe is capable of detecting preselected liquids, e.g. gasoline. Various probes are known. In one type, electric wires are encased in a gasoline-soluble covering. Leaked gasoline into the sleeve area or closed space will eventually dissolve the covering and cause a current in the wires to short circuit.

It should be apparent that variations of the invention described herein are possible. All such variations are within the scope of the claims.

What is claimed is:

1. A storage tank system having secondary containment means for a fill line leading thereto, said system comprised of:
   (a) a storage tank for storing liquid;
   (b) a sleeve attached to the storage tank in a liquid tight fashion, said sleeve having a cover to form an enclosed sleeve area through which a fill line passes;
   (c) a drip sump compartment positioned on the cover of the sleeve, said drip sump compartment capable of catching spills during a filling operation; and
   (d) a fill line for adding liquid to the tank, said fill line extending through the drip sump compartment and sleeve area, said fill line having an opening at one end within the drip sump compartment for receiving liquid during a filling operation and a second opening at another end which leads to the interior of the storage tank.

2. The storage tank system of claim 1 further wherein the storage tank has a manway and the fill line extends through the manway.

3. The storage tank system of claim 2 wherein the sleeve extends from about twelve inches to about forty-eight inches above the top of the manway.

4. The storage tank system of claim 2 wherein the sleeve is attached to the manway of the storage tank.

5. The storage tank system of claim 4 wherein the sleeve has a lower inwardly extending flange and the manway has a flange at its top surface whereby said sleeve flange and manway flange are held together in a liquid tight fashion.

6. The storage tank system of claim 1 further wherein the drip sump compartment has a cover cap to prevent debris from entering its interior.

7. The storage tank system of claim 6 further wherein a drain valve is positioned in the drip sump compartment to control flow of liquid from said compartment to a drain line which leads to the storage tank's interior.

8. The storage tank system of claim 7 wherein the drip sump compartment is comprised of a lower cylinder secured to the sleeve's cover and an upper slide height cylinder and means to secure said cylinders together when properly adjusted.

9. The storage tank system of claim 1 wherein the fill line is a coaxial fill line comprised of a fill pipe which extends into the storage tank and an outer concentric vapor recovery tube which extends to the top surface of the storage tank.

10. The storage tank system of claim 1 further comprising a leak detection means operably associated with the sleeve area to detect leakage.

11. The storage tank system of claim 10 further comprising an outer wall encasing the storage tank and a leak detection means operably associated with a closed space between the outer wall and inner tank.

12. The storage tank system of claim 1 wherein the storage tank has an internal retained capacity area.

13. The storage tank system of claim 1 further wherein a dispensing line and a vent line for the storage tank pass through the sleeve area.

14. The storage tank system of claim 1 further wherein the sleeve cover is held in a liquid tight manner to the sleeve.

15. The storage tank system of claim 7 wherein the drip sump compartment has a capacity of about one to twenty-two gallons.

* * * * *